United States Patent
Hung et al.

(10) Patent No.: US 7,357,653 B2
(45) Date of Patent: Apr. 15, 2008

(54) DUAL-SLOT MEMORY CARD ADAPTER

(75) Inventors: Kun-Ming Hung, Taoyuan (TW); Ta-Chih Yu, Taoyuan (TW); Chien-Yeh Lee, Taoyuan (TW); Chih-Hao Wu, Taoyuan (TW)

(73) Assignee: Proconn Technology Co., Ltd., Taoyuan (TW)

( * ) Notice: Subject to any disclaimer, the term of this patent is extended or adjusted under 35 U.S.C. 154(b) by 5 days.

(21) Appl. No.: 11/446,174

(22) Filed: Jun. 5, 2006

(65) Prior Publication Data

US 2006/0276082 A1 Dec. 7, 2006

(30) Foreign Application Priority Data

Jun. 6, 2005 (TW) ............................... 94209413 U
Oct. 13, 2005 (TW) ............................... 94217702 U
Oct. 13, 2005 (TW) ............................... 94217703 U

(51) Int. Cl.
*H01R 24/00* (2006.01)

(52) U.S. Cl. ....................................... 439/138; 439/630
(58) Field of Classification Search ................ 439/138, 439/630, 137, 136, 946
See application file for complete search history.

(56) References Cited

U.S. PATENT DOCUMENTS 5,964,600 A * 10/1999 Miles et al. ................. 439/140
6,368,122 B2 * 4/2002 Billman ....................... 439/138
6,454,580 B1 * 9/2002 Hwang ........................ 439/138
6,568,960 B2 * 5/2003 Bricaud et al. .............. 439/630
6,666,724 B1 * 12/2003 Lwee .......................... 439/630
7,044,757 B1 * 5/2006 Yen ............................. 438/138
7,083,440 B2 * 8/2006 Shen et al. .................. 439/138
7,112,095 B2 * 9/2006 Shen et al. .................. 439/630
2001/0049214 A1 * 12/2001 Billman ....................... 439/138
2004/0082225 A1 * 4/2004 Hung et al. .................. 439/630
2006/0014436 A1 * 1/2006 Wu et al. ..................... 439/630
2006/0046574 A1 * 3/2006 Nozue et al. ................ 439/630

* cited by examiner

*Primary Examiner*—Gary F. Paumen
(74) *Attorney, Agent, or Firm*—Troxell Law Office, PLLC

(57) ABSTRACT

A dual-slot memory card adapter includes a base, a space in the base, a partitioning member integrated with the adapter or separately and laterally disposed in the space to divide the space into upper and lower slot areas, one corresponding attachment each provided on both sides of the base, a card allotment mechanism pivoted to the attachments and operating between two ports of both slots, and a lid automatically closing up one port to a slot when a memory card is inserted into another slot to prevent insertion and judgment by mistake.

16 Claims, 12 Drawing Sheets

DUAL-SLOT MEMORY CARD ADAPTER

BACKGROUND OF THE INVENTION (a) Field of the Invention

The present invention is related to a dual-slot memory card adapter, and more particularly, to one with its card allotment mechanism to close up a port while admitting insertion of a memory card into another port to avoid insertion or judgment by mistake.

(b) Description of the Prior Art

To cope with data access applications of electronic consumer products, memory cards in different specifications and capacities are supplied by electronic memory card companies, and R&D efforts and launching into the market of mini memory cards. At present, those memory cards and mini memory cards generally available in the market include (that taught in Taiwan Patent Gazette Nos. M262893, M250363, and M256597) SD (Secure Digital), Mini SD, MMC (Multimedia Card), RS MMC (Reduced Multimedia Card), MMC4.0, and RS MMC 4.0. To make access applications working between memory card and electronic consumer product, a memory card adapter is placed to link the access. Meanwhile, to cope with the fact that the access volume and the applicability of the specification are not inclusive, the memory card adapter must be applicable to memory cards of various specifications, a dual-slot adapter is made available according to similar features demonstrated in specification, insertion and secure, and electric connection among those memory cards.

However, erroneous judgment of signal access can be easily made while placing two memory cards of different specifications into the adapter of the prior art since the electronic consumer product is not necessarily provided with access switch function.

SUMMARY OF THE INVENTION

The primary purpose of the present invention is to provide an improved construction of a memory card adapter capable of avoiding insertion of the wrong memory card and preventing the electronic product from making wrong judgment of the memory card.

To achieve the purpose, the present invention includes a base, and a card allotment mechanism. The base contains a space for accommodation; an upper and a lower slot area are integrated with the space or a partitioning member is laterally disposed in the space to define the upper slot area and the lower slot area; a corresponding recess is each disposed on both sides of the base; a first contact terminal set is arranged in the upper slot area; a second contact terminal set is arranged in the lower slot area; and a port is provided to each slot area.

The card allotment mechanism includes a body and two axles extending towards both free ends of the body; and each axle is pivoted to an attachment and operates at where between both ports of the slot areas; and a lid automatically close up one port whenever a memory card is inserted into the other port.

DETAILED DESCRIPTION OF THE PREFERRED EMBODIMENTS

Figure 1:
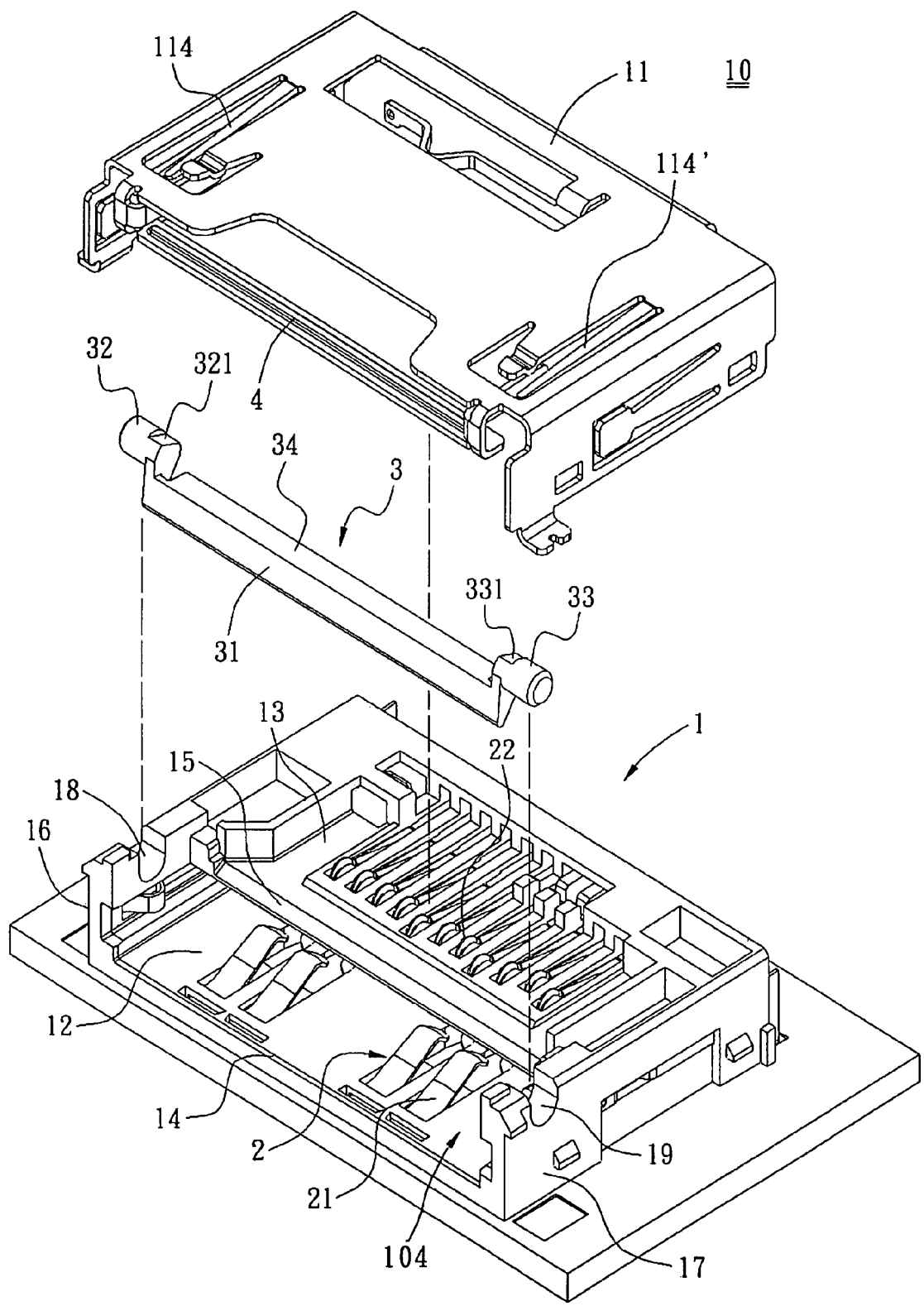
FIG. 1 is an exploded view of the present invention.
Figure 2:
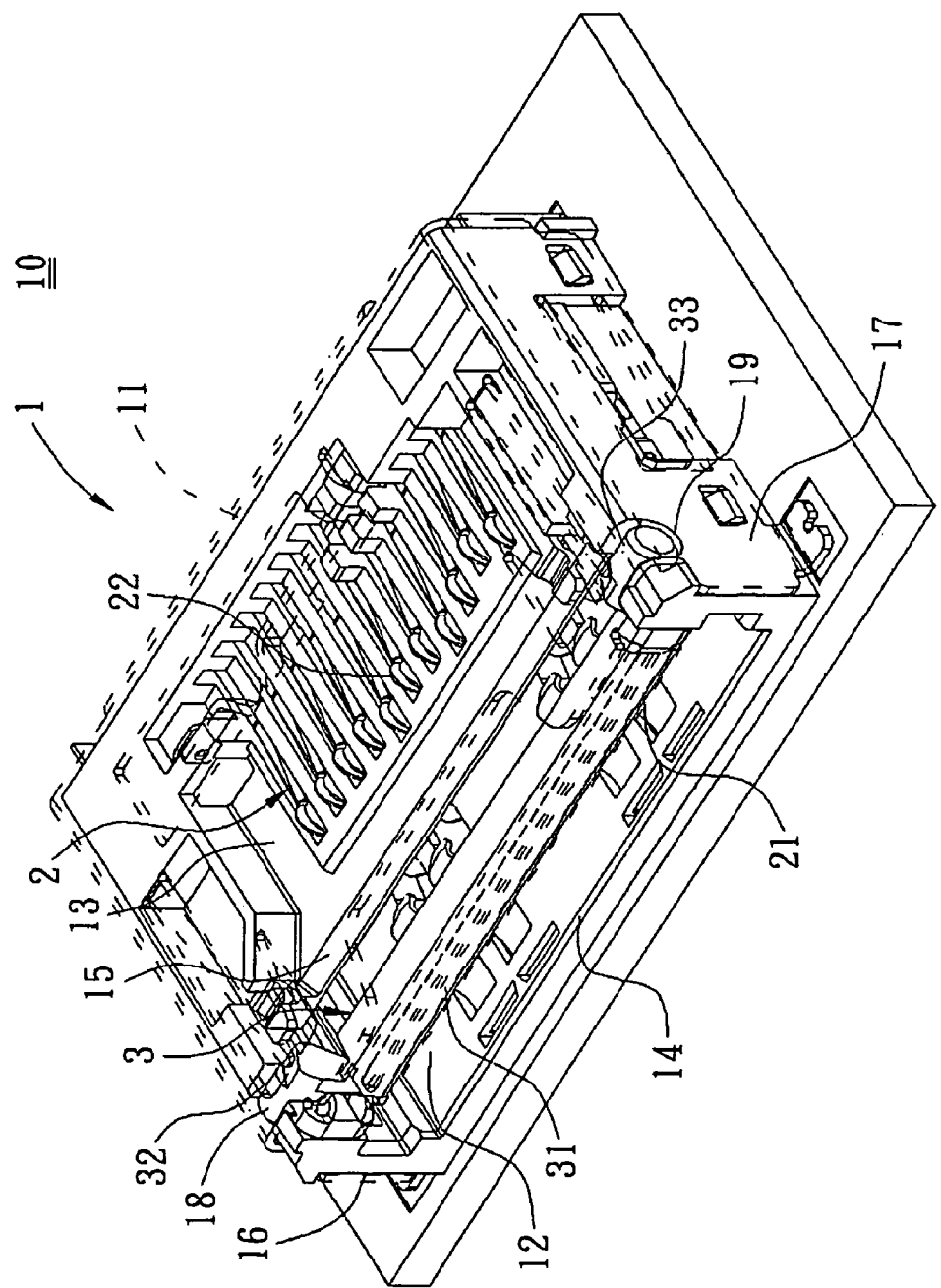
FIG. 2 is a perspective view of an assembly of the present invention.
Figure 3:
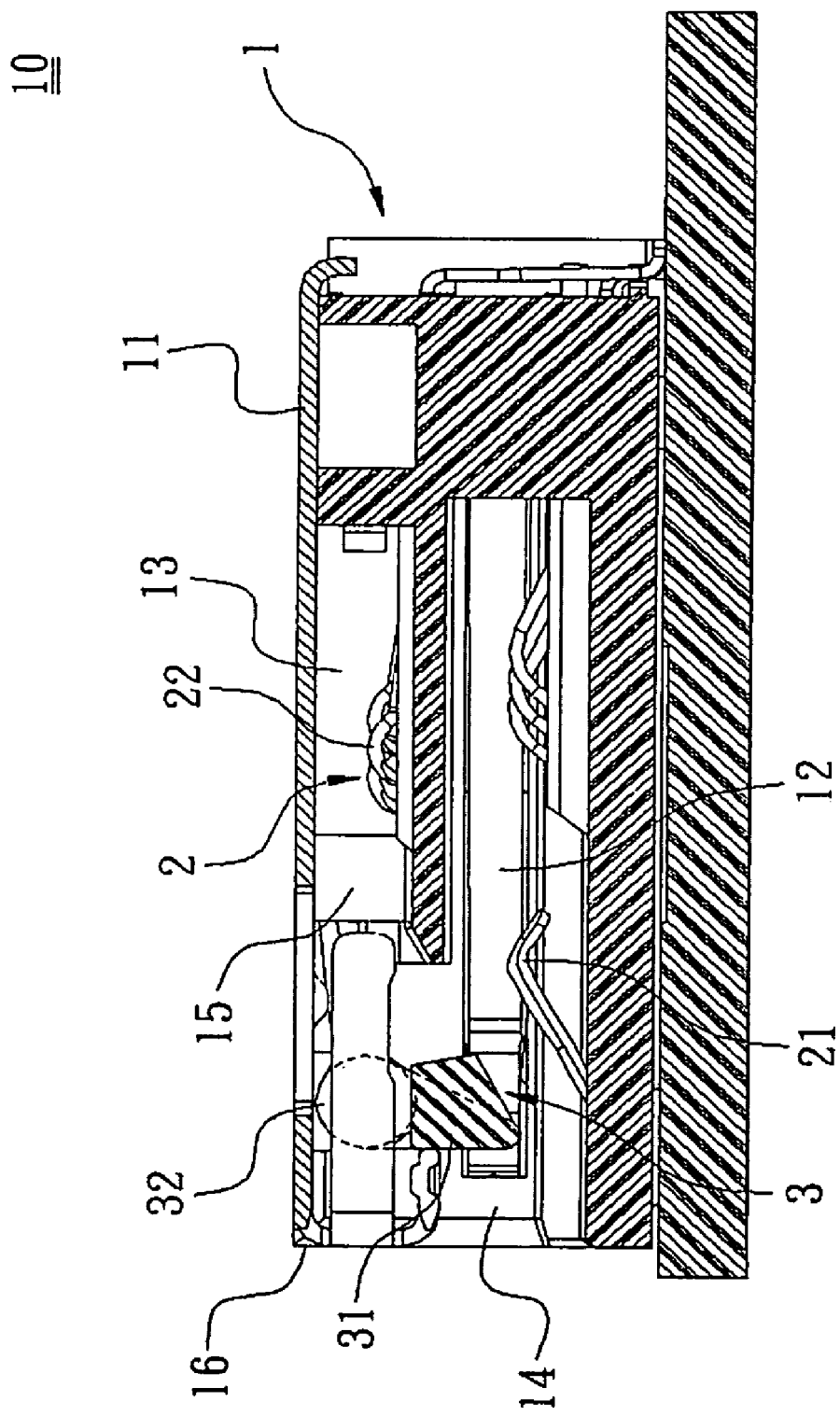
FIG. 3 is a sectional view of the assembly of the present invention.

FIGS. 1, 2, and 3 respectively shows an exploded view, a perspective view, and a sectional view of a preferred embodiment of the present invention. As illustrated, an improved construction of a memory card adapter of the present invention includes a base 1, a lid 11 attached to the base 1, multiple contact terminal sets 2, a card allotment mechanism 3 pivoted to the base 1 and located between two slot areas 12, 13 to avoid erroneous prevent simultaneous insertion of two memory cards, and a card ejection mechanism.

The base 1 is installed in an electronic product and contains an accommodation space 104 to define the upper slot area 12 and the lower slot area 13, or a partitioning member 4 is laterally disposed in the space 104 using the injection molding method to create the upper and the lower slot areas 12, 13. Both of the upper slot area 12 and the lower slot area 13 respectively allow insertion of memory cards in different specifications. Two corresponding ports 14, 15 are respectively formed on one end each of the upper and the lower slot areas 12, 13 to receive insertion of memory cards; and one corresponding recess 18, 19 is each provided on both side walls 16, 17 of the base.

In the preferred embodiment, both of the upper and the lower slot areas 12, 13 are integrated with the base 1 using the injection molding method. The partitioning member 4 is disposed at the front end of the lid 11 to segregate entrances of memory cards respectively to the upper and the lower slot areas 12, 13. Two resilient parts 114, 114' are respectively provided on both sides of the lid 11 to snap on the card allotment mechanism 3.

Terminals 2 include a first contact terminal set 21 disposed in the upper slot area 12 to receive insertion of a first memory card (SD memory card, 4.0 MMC memory card, or MMC card) (not illustrated), and a second contact terminal set 22 disposed in the lower slot area 13 to contact and conduct a first memory card (Mini SD memory card) 5.

The card allotment mechanism 3 includes a body 31 and axles 32, 33 respectively extending to both free ends of the body 31 to be pivoted to both recesses 18, 19 to execute free revolution against both slot areas 12, 13, thus to change the location for the body 31 to close up either of the slot areas 12, 13. A recessed area 34 is created at between both axles 32, 33 and where above the body 31. Each of both axles 32, 33 is disposed with a flat area 321, 331 to snap on the resilient part 114, 114' to secure the card allotment mechanism 3.

Figure 4:
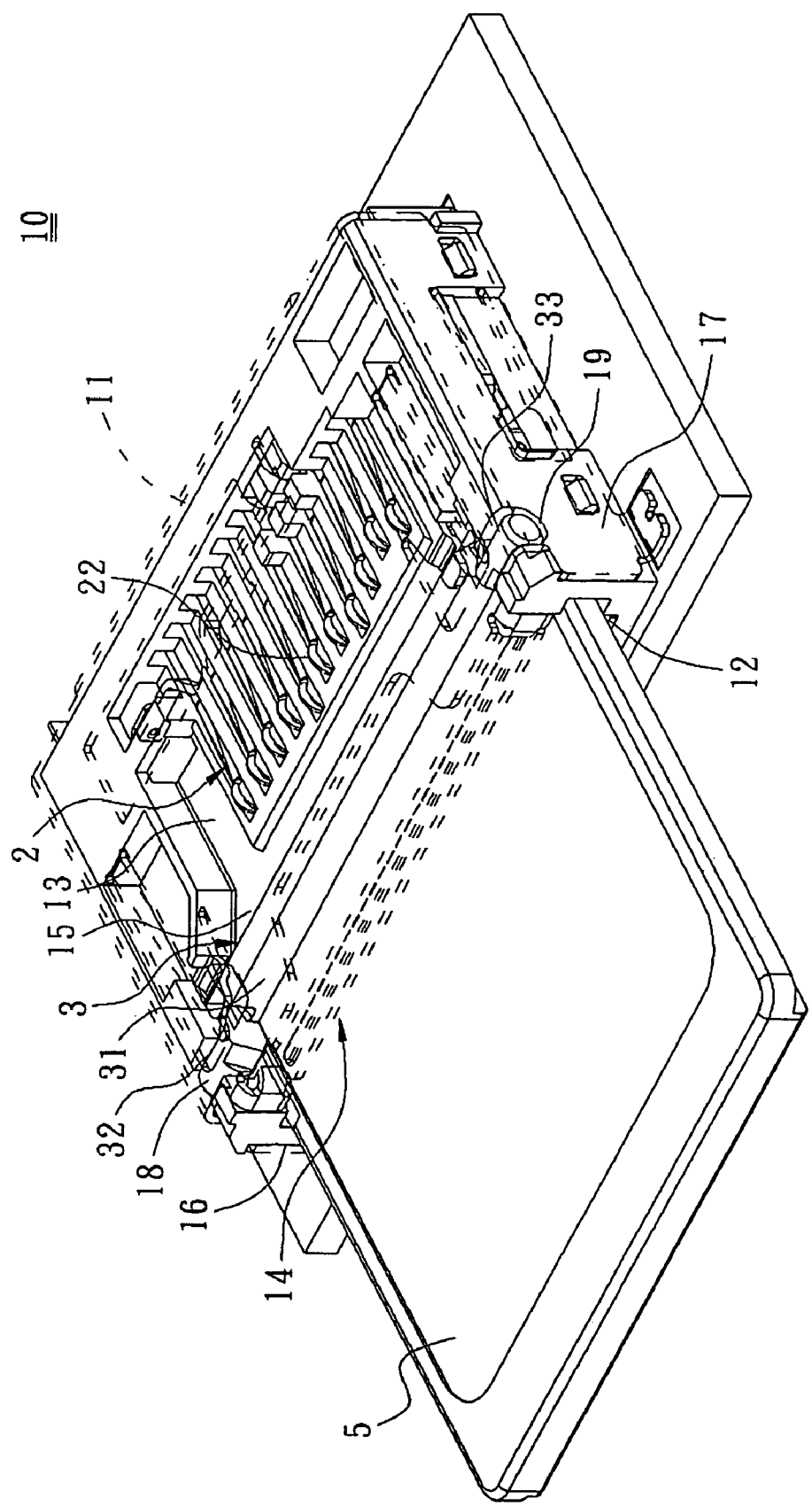
FIG. 4 is schematic view showing a status of the present invention having a first memory card inserted into an upper slot area.
Figure 5:
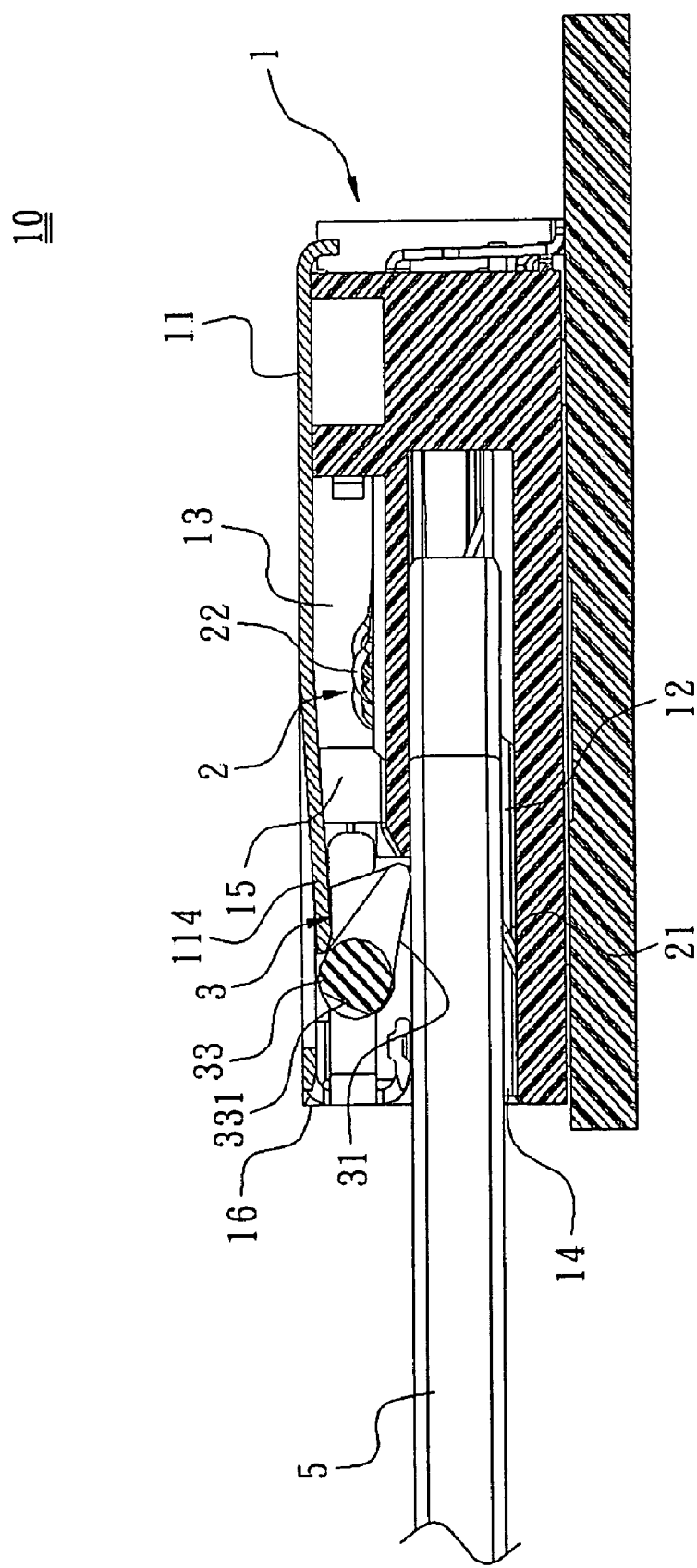
FIG. 5 is schematic view showing a status of the present invention having the first memory card inserted into an upper slot area.

FIGS. 4 and 5 respectively shows a perspective view and a sectional view of the status of the memory card inserted into the slot area of the present invention. As illustrated, the memory card 5 before being inserted into the slot area, both resilient parts 114, 114' of the lid 11 snap on the flat areas 321, 331 of both axles 32, 33. Once the memory card (SD or 4.0 MMC memory card) 5 is inserted into the upper slot area 12, the body 31 of the card allotment mechanism 3 is pushed away by the memory card 5 and both axles 32, 33 of the card allotment mechanism 3 respectively revolve in the recesses 18, 19. Meanwhile both ends respectively of the resilient parts 114, 114' follow through the arc of the axles 32, 33 to snap on both sides of the body 31 to allow the body 31 of the card allotment mechanism 3 turn to the port of the lower slot area 13 for avoiding misjudgment by preventing the insertion of another memory card into the lower slot area 13. Once the memory card 5 is drawn out, both ends respectively of the resilient parts 114, 114' descend the body 31 and return it to its original status.

Figure 6:
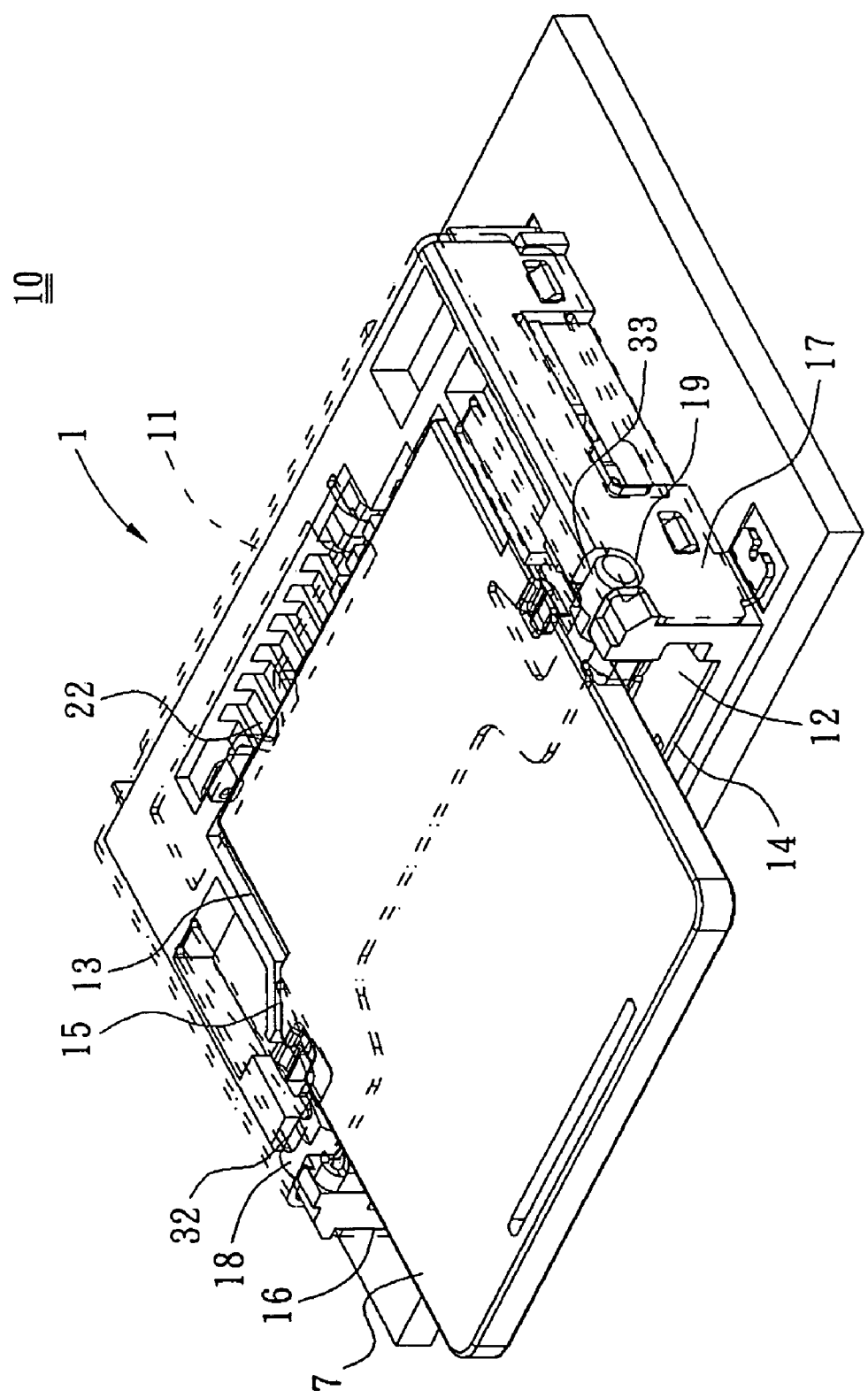
FIG. 6 is schematic view showing a status of the present invention having a second memory card inserted into a lower slot area.
Figure 7:
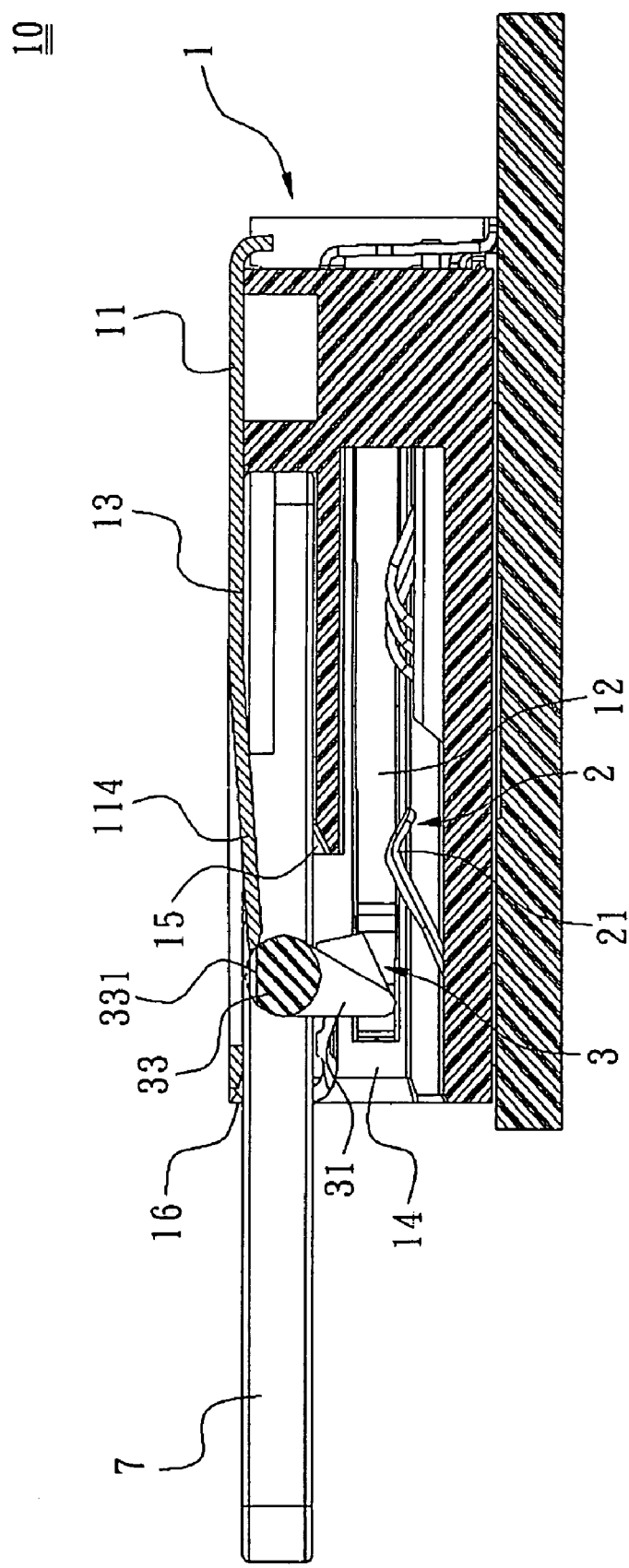
FIG. 7 is schematic view showing a status of the present invention having the second memory card inserted into a lower slot area.
Figure 8:
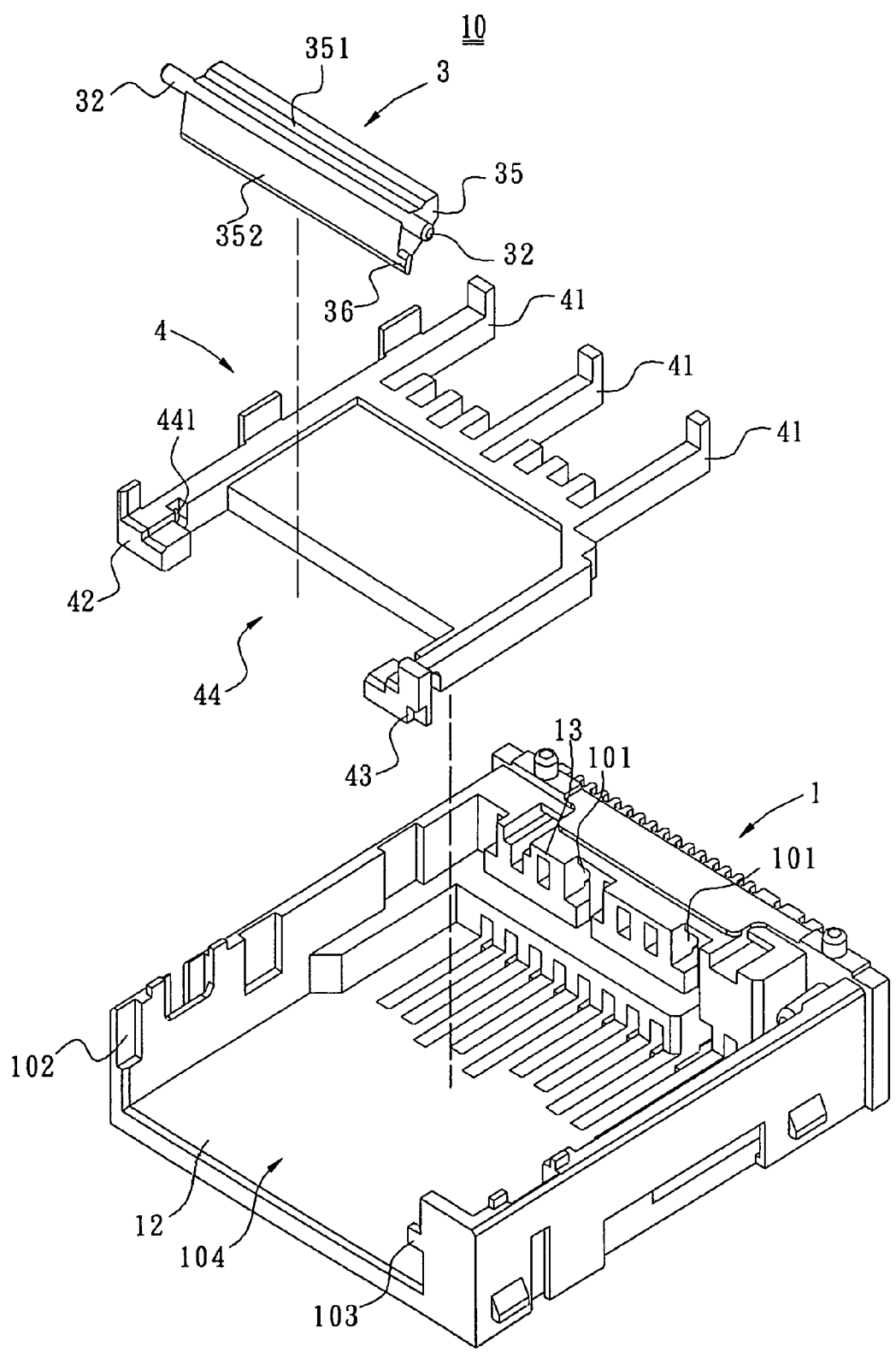
FIG. 8 is an exploded view of a second preferred embodiment of the present invention.

FIGS. 6 and 7 respectively shows a perspective view and a sectional view of another memory card inserted into the other slot area. As illustrated, a second memory card (Mini SD memory card) 7 directly passes through the recessed area 34 over the body 31 and enters into the lower slot area 13 while both flat areas 321, 331 of the axles 32, 33 of the lid 3 are restricted by both resilient parts 13. At the time, if any memory card is to be inserted into the upper slot area 12, the body 31 is prevented from turning since the memory card 7 has been already inserted into the lower slot area. Accordingly, the other memory card is prevented from being inserted into the upper slot area.

Figure 9:
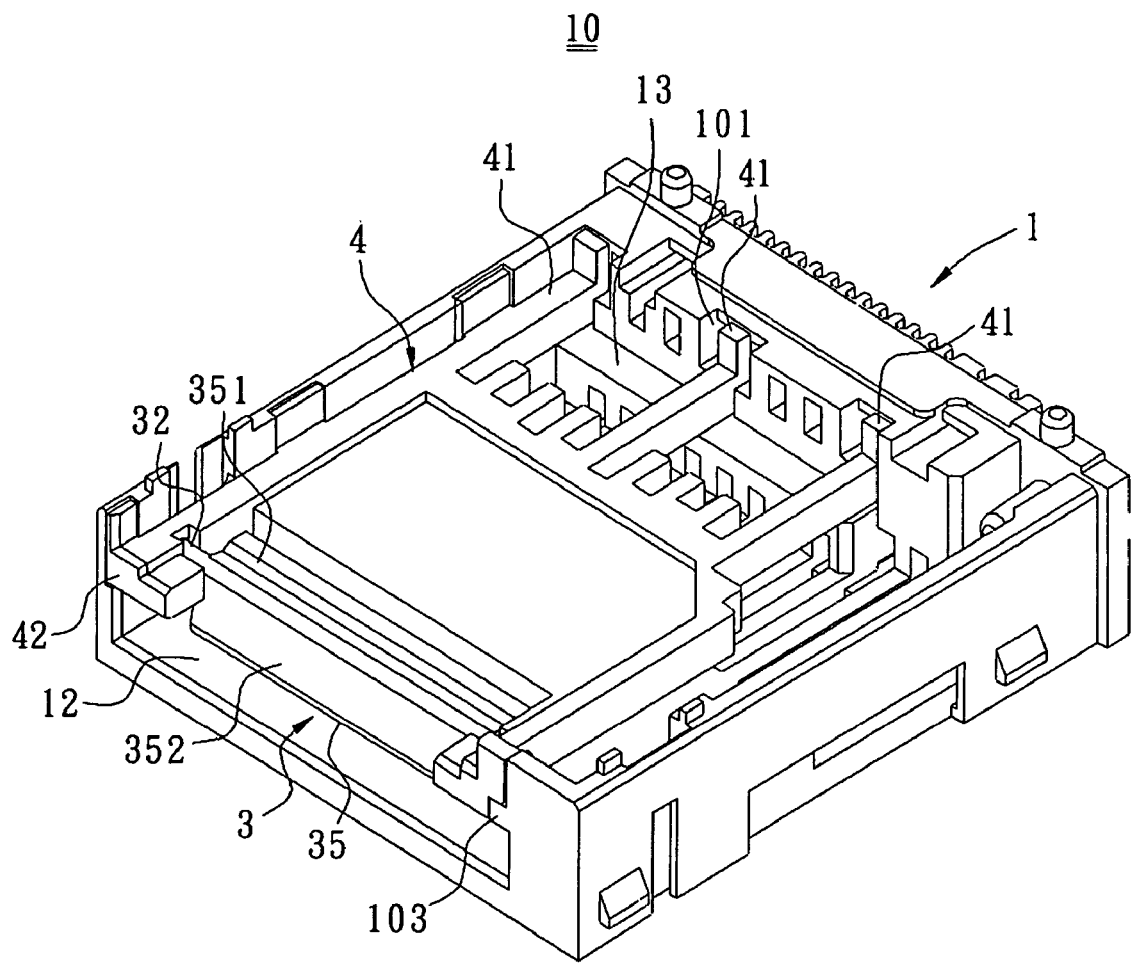
FIG. 9 is a perspective view of the second preferred embodiment of the present invention.

FIGS. 8 through 11 respectively shows an exploded view, a perspective view and a sectional view of another preferred embodiment of the present invention. As illustrated, the partitioning member 4 and the lid 11 are laterally provided in the space 104 to define the upper and the lower slot areas 12, 13; and contact terminals 21, 22 are respectively disposed in the upper and the lower slot areas 12, 13 to allow respective insertion of multiple memory cards of different specifications. Multiple supporting arms 41 disposed behind the partitioning member 4 respectively stride over locking gaps 101 disposed to the base 1. A protruding block 42 and a recessed part 43 disposed on both sides at the front end of the partitioning member 4 are respectively placed on a trough 102 and a locking block 103 disposed on the front end of the base 1. Accordingly, the engagement between the protruding block 42 and the trough 102 merely restricts the lateral displacement of the partitioning member 4 on the base 1; meanwhile the engagement between the recessed part 43 and the locking block 103 merely restricts the longitudinal displacement of the partitioning member 4 on the base 1. The partitioning member 4 is therefore secured on the base 1 while defining the upper and the lower slot areas 12, 13 for the space 104 in the base 1 to receive insertions of the first and the second memory cards 5, 7 of different specifications as illustrated in FIG. 9.

The card allotment mechanism is also disposed to the ports of both slot areas 12, 13. In this preferred embodiment, the card allotment mechanism 3 is comprised of an awl shape push block 35 generally in the form of a triangle. The push block 35 includes a first pushing part 351 located in the upper slot area 12, a second pushing part 352 located in the lower slot area 13, and an axle 32 formed at the end of the push block 35. An opening 44 is formed at the front end of the partitioning member 4 and a pivoting channel 441 is each disposed on both sides in relation to the opening 44 to allow the push block 35 to turn around at the opening 44. A limiting block 36 protrudes from where below the right side of the second pushing part 352 and a limiting channel 45 corresponding to the limiting block 36 is disposed behind the recessed part 43 of the partitioning member 4 so to limit the turning orientation of the card allotment mechanism 3.

Figure 10:
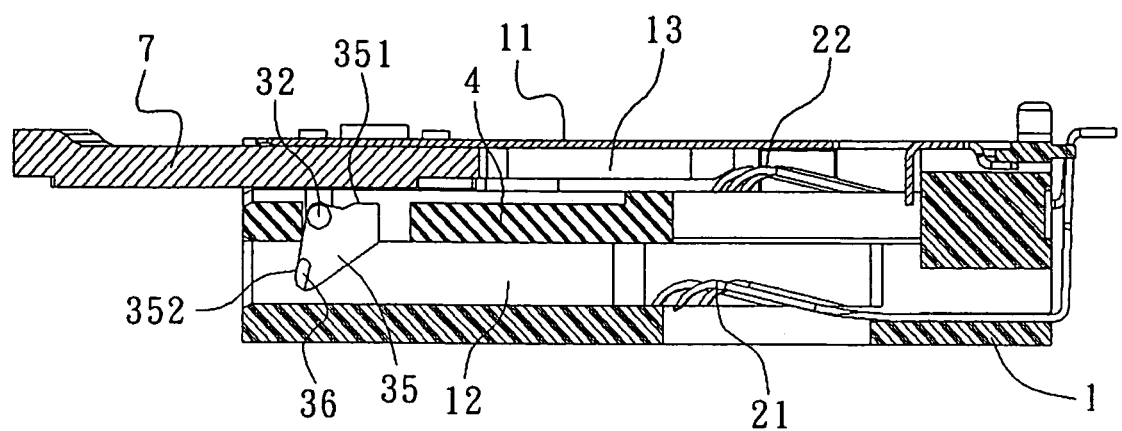
FIG. 10 is a sectional view showing that the second memory card is placed in the lower slot area of the second preferred embodiment of the present invention.
Figure 11:
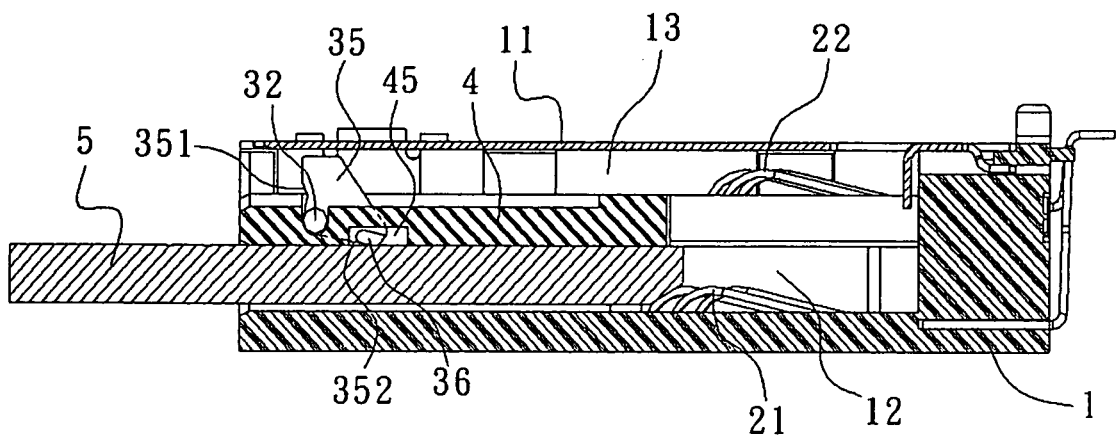
FIG. 11 is a sectional view showing that the second memory card is placed in the upper slot area of the second preferred embodiment of the present invention.

FIGS. 10 and 11 respectively shows a perspective view and a sectional view of the status when the first memory card of the present invention to enter into the slot area. As illustrated, before the insertion of the first memory card into the slot area, the push block 35 is located in the upper slot area. Once the first memory card 5 is inserted into the upper slot area 12, the first memory card 5 pushes forward the first pushing part 351 of the push block 35, and the push block 35 turns downward with the axle 32 as the axis to facilitate inserting the first memory card 5 into the upper slot area 12 to contact and get conducted with the first contact terminal set 21 while the push block 35 is turned to enter into the lower slot area 13. Accordingly, the port to the lower slot area 13 is blocked by the push block 35 to prevent insertion of the first memory card 5.

Once the first memory card 5 is inserted into the lower slot area 12, the second memory card 7 moves forward to push the second pushing part 352 of the push block 35 for the push block 35 to turn upward with the axle 32 as the axis, thus to facilitate insertion of the first memory card 5 into the lower slot area 13 to contact and get conducted with the second contact terminal set 22; meanwhile, the port to the upper slot area 12 is blocked by the push block 35 to prevent insertion of the first memory card 5.

Figure 12:
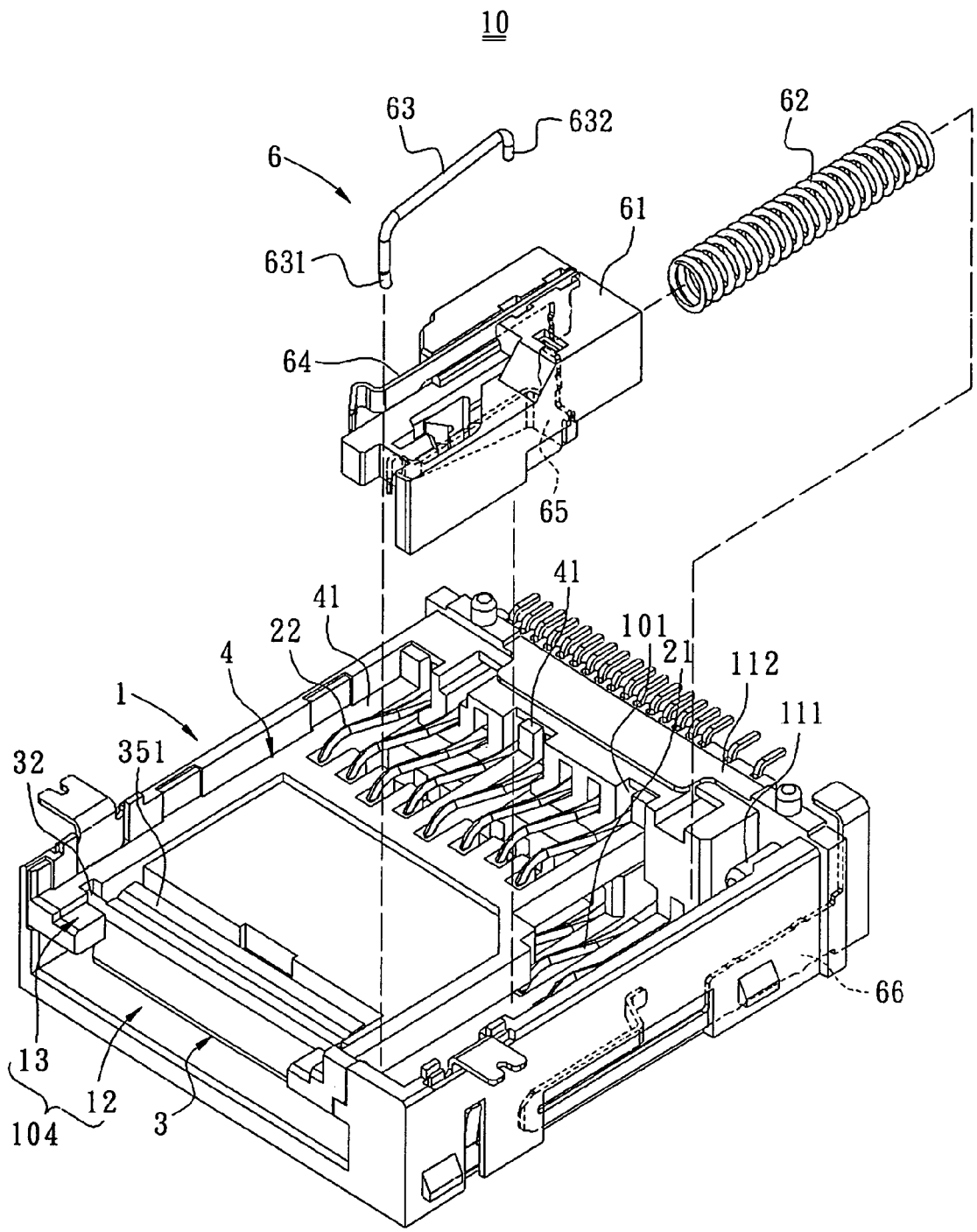
FIG. 12 is an exploded view showing a card ejection mechanism of the second preferred embodiment of the present invention.
Figure 13:
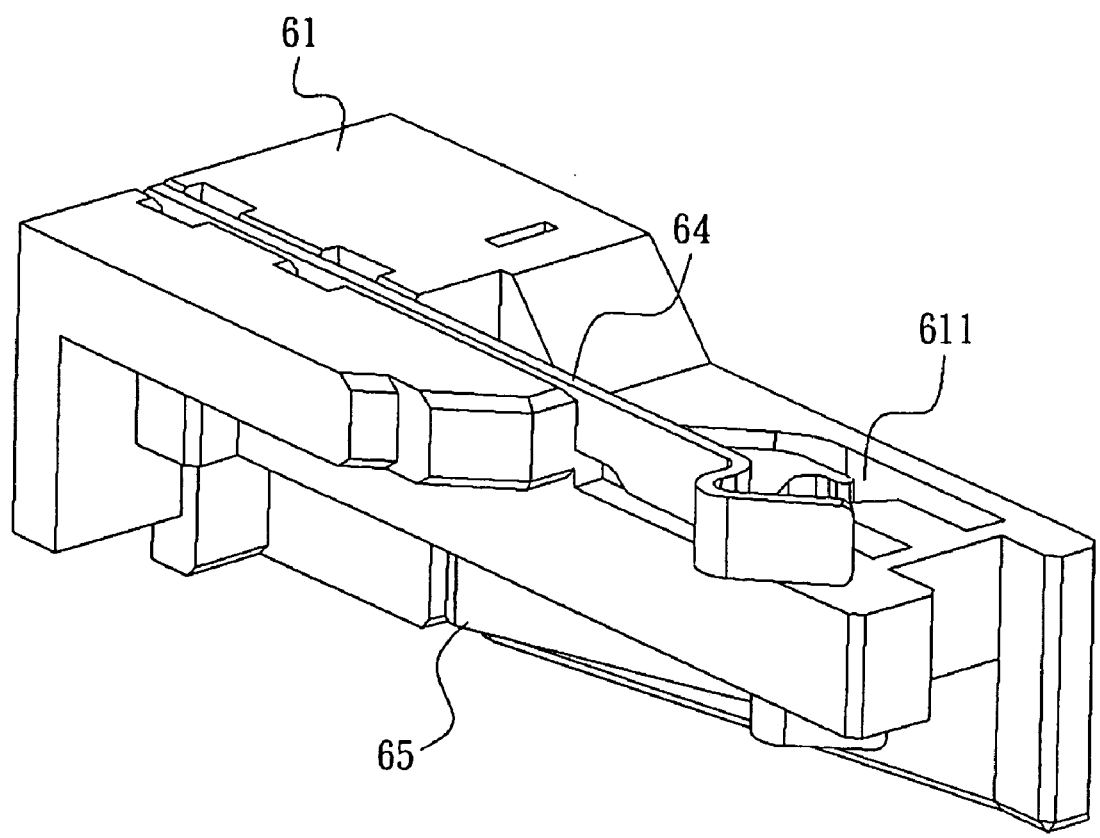
FIG. 13 is a perspective view showing an assembly of the card ejection mechanism of the second preferred embodiment of the present invention.

FIGS. 12 and 13 respectively shows an exploded view and a perspective view of the base 1 adapted with a card ejection mechanism. As illustrated, an ejection mechanism 6 disposed to one side of the base 1 is comprised of a sliding member 61, an elastic member 62, a linking member 63, an upper locking spring tag 64, a lower locking spring tag 65, and a detection spring tag 66. The elastic member 62 relates to a compressed spiral spring with one end inserted to a guide post 111 disposed to a rear plate 1112 of the base and another end holding against the sliding member 61. The linking member 63 relates to a rod in a shape of "⊓". The linking member 63 and the elastic member 62 are respectively disposed on both sides of the sliding member 61. One free end 631 of the linking member 63 is fixed to the base 1 and another free end 632 of the linking member 63 is disposed in a tracing channel 611 disposed on the sliding member 61 as illustrated in FIG. 13 to follow the movement of the sliding member 61. The free end 632 of the linking member 63 slides in the tracking channel 611 and outwardly deflects due to displacement produced by the detection spring tag 66 for the detection spring tag 66 to attach to the inner side of the contact spring tag, then the signal of the message that the memory card has been inserted in position will be transmitted to a printed circuit board.

By means of the card ejection mechanism 6, the first and the second memory cards 5, 7 of different specifications executing card insertion and card ejection in the upper and the lower slot areas 12, 13 may share the slide member 61 and the detection spring tag 66 of the card ejection mechanism 6 to facilitate the use of the entire memory card adapter 10.

The prevent invention provides an improved structure of a dual-slot memory card adapter light guide, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A dual-slot memory card adapter includes a base and a card allotment mechanism; the base contains an upper slot area and a lower slot area and an attachment being provided on both sides of the base; the card allotment mechanism being pivoted to the attachments and operating between a port of the upper slot area and another port of the lower slot area; and one port being automatically closed up when the other port has a memory card inserted therein.

2. A dual-slot memory card adapter of claim 1, wherein the card allotment mechanism includes a body and two axles respectively extending toward two free ends of a lid.

3. A dual-slot memory card adapter of claim 2, wherein a recessed area is formed between each axle and above the body of the card allotment mechanism.

4. A dual-slot memory card adapter of claim 1, wherein the base contains a space and the upper and the lower slot areas are integrated with the space.

5. A dual-slot memory card adapter of claim 1, wherein the base contains a space and a partitioning member is laterally disposed in the space to provide the upper and the lower slot areas.

6. A dual-slot memory card adapter of claim 1, wherein the base further includes a lid.

7. A dual-slot memory card adapter of claim 1, wherein the upper slot area allows insertion of a first memory card, and the lower slot area allows insertion of a second memory card.

8. A dual-slot memory card adapter of claim 1, wherein one side of the base further includes a card ejection mechanism.

9. A dual-slot memory card adapter of claim 8, wherein the card ejection mechanism includes a sliding member and a detection spring tag.

10. A dual-slot memory card adapter includes a base, a partitioning member, multiple contact terminals, and a card allotment mechanism; the base containing a space; the partitioning member laterally disposed in the space to define an upper and a lower slot areas; multiple memory cards of different specifications being respectively inserted in both slot areas; the partitioning member and the base being separately produced before mounting the former to the latter; multiple contact terminals being respectively mounted to a first contact terminal set in the upper slot area and to a second contact terminal set in the lower slot area; and the card allotment mechanism being disposed at both ports of the slot areas and pushed by a memory card inserted into one slot area to automatically close up the port of the other slot area.

11. A dual-slot memory card adapter of claim 10, wherein the card allotment mechanism is comprised of an awl shape push block generally in the form of a triangle; the push block includes a first pushing part located in the upper slot area, a second pushing part located in the lower slot area, and an axle formed at the end of the push block; an opening is formed at the front end of the partitioning member, and a pivoting channel is each disposed on both sides in relation to the opening to allow the push block to turn around at the opening.

12. A dual-slot memory card adapter of claim 10, wherein a plurality of supporting arms extends backward from the rear of the partitioning member.

13. A dual-slot memory card adapter of claim 10, wherein the base further includes a lid.

14. A dual-slot memory card adapter of claim 10, wherein he upper slot area allows insertion of a first memory card, and the lower slot area allows insertion of a second memory card.

15. A dual-slot memory card adapter of claim 10, wherein one side of the base further includes a card ejection mechanism.

16. A dual-slot memory card adapter of claim 11, wherein the card ejection mechanism includes a sliding member and a detection spring tag.

* * * * *